US009886159B2

(12) United States Patent
Fox et al.

(10) Patent No.: US 9,886,159 B2
(45) Date of Patent: Feb. 6, 2018

(54) SELECTING PORTIONS OF COMPUTER-ACCESSIBLE DOCUMENTS FOR POST-SELECTION PROCESSING

(75) Inventors: Joshua Fox, Emek haela (IL); Michael Pelts, Jerusalem (IL); Vladislav Pavel Rybak, Ofakim (IL)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 13/431,032

(22) Filed: Mar. 27, 2012

(65) Prior Publication Data

US 2012/0192066 A1 Jul. 26, 2012

Related U.S. Application Data

(63) Continuation of application No. 12/648,413, filed on Dec. 29, 2009.

(51) Int. Cl.
*G06F 3/0481* (2013.01)
*G06F 17/21* (2006.01)
*G06F 21/62* (2013.01)

(52) U.S. Cl.
CPC .......... *G06F 3/0481* (2013.01); *G06F 17/211* (2013.01); *G06F 21/6245* (2013.01)

(58) Field of Classification Search
CPC ............. G06F 3/0482; G06F 17/30011; G06F 17/30528; G06F 17/30864
USPC .................. 715/764, 769, 799, 724, 711
See application file for complete search history.

(56) References Cited

U.S. PATENT DOCUMENTS

| | | |
|---|---|---|
| 5,619,648 A | 4/1997 | Canale |
| 5,664,109 A | 9/1997 | Johnson |
| 5,940,843 A | 8/1999 | Zucknovich |
| 5,960,080 A | 9/1999 | Fahlman et al. |
| 6,052,682 A | 4/2000 | Miller |
| 6,115,704 A | 9/2000 | Olson et al. |

(Continued)

FOREIGN PATENT DOCUMENTS

| | | |
|---|---|---|
| EP | 1077421 A2 | 2/2001 |
| EP | 1638032 | 3/2006 |

(Continued)

OTHER PUBLICATIONS

IBM, "InfoSphere Guardium Data Redaction", Solution Brief, IBM Software, Jul. 2012.

(Continued)

*Primary Examiner* — Jeffrey A Gaffin
*Assistant Examiner* — Sabrina Greene
(74) *Attorney, Agent, or Firm* — Janaki K. Davda; Konrad, Raynes, Davda and Victor LLP (57) ABSTRACT

Processing documents by highlighting a portion of a document displayed on a computer display, where the portion is highlighted when a cursor is in a predefined location of the display relative to the location of the portion of the document, where the portion is identified as a candidate for selection for a post-selection operation prior to the cursor being in the predefined location of the display, and where the highlighting is done independent of any input received via a computer input device to indicate the extents of the portion, and recording a selection of the portion when an input that is predefined to indicate a selection action is received in association with the portion via a computer input device.

10 Claims, 6 Drawing Sheets

(56) References Cited

U.S. PATENT DOCUMENTS

| | | | |
|---|---|---|---|
| 6,161,084 A | 12/2000 | Messerly | |
| 6,178,439 B1 | 1/2001 | Feit | |
| 6,226,635 B1 | 5/2001 | Katariya | |
| 6,330,610 B1 | 12/2001 | Docter | |
| 6,336,117 B1 | 1/2002 | Massarani | |
| 6,453,327 B1 | 9/2002 | Nielsen | |
| 6,539,371 B1 | 3/2003 | Bleizeffer | |
| 6,640,010 B2 | 10/2003 | Seeger | |
| 6,820,082 B1 | 11/2004 | Cook | |
| 6,820,237 B1 | 11/2004 | Abu-Hakima | |
| 6,879,977 B2 | 4/2005 | Huffman | |
| 6,928,618 B2 | 8/2005 | Kohls | |
| 6,931,403 B1 | 8/2005 | Agrawal | |
| 6,952,720 B2 | 10/2005 | Guedalia | |
| 7,028,049 B1 | 4/2006 | Shelton | |
| 7,181,495 B2 | 2/2007 | Skladman | |
| 7,194,693 B2 | 3/2007 | Cragun | |
| 7,206,814 B2 | 4/2007 | Kirsch | |
| 7,243,097 B1 | 7/2007 | Agrawal | |
| 7,293,017 B2 | 11/2007 | Hurst-hiller | |
| 7,316,032 B2 | 1/2008 | Tayebi | |
| 7,412,605 B2 | 8/2008 | Raley | |
| 7,523,135 B2 | 4/2009 | Bradford | |
| 7,660,798 B1 * | 2/2010 | Ludwig et al. | 726/11 |
| 7,730,010 B2 | 6/2010 | Kishore | |
| 7,748,027 B2 | 6/2010 | Patrick | |
| 7,752,566 B1 | 7/2010 | Nelson | |
| 7,802,305 B1 | 9/2010 | Leeds | |
| 7,805,673 B2 | 9/2010 | der Quaeler et al. | |
| 7,873,838 B2 | 1/2011 | Staddon | |
| 9,195,853 B2 | 11/2015 | Fox et al. | |
| 9,224,007 B2 | 12/2015 | Fox et al. | |
| 2002/0165021 A1 | 11/2002 | Several | |
| 2002/0165201 A1 | 11/2002 | Binderup et al. | |
| 2004/0054918 A1 | 3/2004 | Duri | |
| 2004/0061716 A1 | 4/2004 | Cheung | |
| 2004/0073461 A1 | 4/2004 | Pappas | |
| 2004/0139043 A1 | 7/2004 | Lei | |
| 2004/0240735 A1 | 12/2004 | Medina | |
| 2005/0140572 A1 | 6/2005 | Kahan | |
| 2005/0283471 A1 | 12/2005 | Ahmed | |
| 2006/0026159 A1 | 2/2006 | Dettinger | |
| 2006/0031301 A1 | 2/2006 | Herz | |
| 2006/0053097 A1 | 3/2006 | King | |
| 2006/0136985 A1 | 6/2006 | Ashley | |
| 2006/0156222 A1 | 7/2006 | Chi | |
| 2006/0259954 A1 | 11/2006 | Patrick | |
| 2006/0259977 A1 | 11/2006 | Patrick | |
| 2007/0030528 A1 | 2/2007 | Quaeler et al. | |
| 2007/0094284 A1 | 4/2007 | Bradford | |
| 2007/0094594 A1 | 4/2007 | Matichuk | |
| 2007/0118534 A1 | 5/2007 | Hayes et al. | |
| 2007/0192122 A1 | 8/2007 | Routson et al. | |
| 2007/0192734 A1 | 8/2007 | Berstis | |
| 2007/0203776 A1 | 8/2007 | Austin | |
| 2007/0239653 A1 | 10/2007 | Kiehn | |
| 2007/0255704 A1 | 11/2007 | Baek | |
| 2007/0266079 A1 | 11/2007 | Criddle et al. | |
| 2007/0271212 A1 | 11/2007 | Jones | |
| 2007/0274478 A1 | 11/2007 | Crawford, III | |
| 2007/0276649 A1 | 11/2007 | Schubert | |
| 2008/0016341 A1 | 1/2008 | Staddon et al. | |
| 2008/0016372 A1 | 1/2008 | Staddon et al. | |
| 2008/0046757 A1 | 2/2008 | Staddon et al. | |
| 2008/0052759 A1 | 2/2008 | Kronlund | |
| 2008/0072290 A1 | 3/2008 | Metzer | |
| 2008/0204788 A1 | 8/2008 | Kelly | |
| 2008/0250021 A1 | 10/2008 | Boys | |
| 2008/0320604 A1 | 12/2008 | Nakajima | |
| 2009/0037222 A1 | 2/2009 | Kuo | |
| 2009/0089663 A1 | 4/2009 | Rebstock et al. | |
| 2009/0094675 A1 | 4/2009 | Powers et al. | |
| 2009/0132419 A1 | 5/2009 | Grammer | |
| 2009/0164878 A1 | 6/2009 | Cottrille | |
| 2009/0164881 A1 | 6/2009 | Segarra et al. | |
| 2009/0192941 A1 | 7/2009 | Fournier | |
| 2009/0198697 A1 | 8/2009 | Bilger et al. | |
| 2009/0265316 A1 | 10/2009 | Poulin et al. | |
| 2009/0276701 A1 * | 11/2009 | Nurmi | 715/702 |
| 2009/0296166 A1 | 12/2009 | Schrichte | |
| 2009/0299853 A1 | 12/2009 | Jones | |
| 2009/0323087 A1 | 12/2009 | Luo | |
| 2010/0010912 A1 | 1/2010 | Jones | |
| 2010/0046015 A1 | 2/2010 | Whittle | |
| 2010/0070396 A1 | 3/2010 | Schrichte | |
| 2010/0082652 A1 | 4/2010 | Jones | |
| 2010/0229246 A1 | 9/2010 | Warrington | |
| 2010/0241844 A1 | 9/2010 | Hussain | |
| 2011/0055932 A1 | 3/2011 | Fox et al. | |
| 2011/0066606 A1 | 3/2011 | Fox et al. | |
| 2011/0119361 A1 | 5/2011 | Issa et al. | |
| 2011/0119576 A1 | 5/2011 | Aumann | |
| 2011/0162084 A1 | 6/2011 | Fox et al. | |
| 2011/0179352 A1 | 7/2011 | Treadwell et al. | |
| 2011/0239113 A1 | 9/2011 | Hung | |
| 2011/0247081 A1 | 10/2011 | Shelton | |
| 2012/0159296 A1 | 6/2012 | Rebstock et al. | |
| 2012/0239380 A1 | 9/2012 | Cumby et al. | |
| 2012/0304304 A1 | 11/2012 | Avrahami et al. | |
| 2013/0117802 A1 | 5/2013 | Fendt | |
| 2013/0144901 A1 | 6/2013 | Ho et al. | |
| 2013/0151346 A1 | 6/2013 | Schoen | |
| 2013/0185634 A1 | 7/2013 | Fox et al. | |
| 2014/0129936 A1 | 5/2014 | Richards et al. | |
| 2014/0136941 A1 | 5/2014 | Avrahami et al. | |

FOREIGN PATENT DOCUMENTS

| | | |
|---|---|---|
| EP | 1818807 | 8/2007 |
| EP | 2375353 A1 | 10/2011 |
| JP | 2004252773 | 9/2004 |
| WO | WO2006041318 A1 | 4/2006 |
| WO | 2006104810 A3 | 10/2006 |
| WO | WO2006104810 A2 | 10/2006 |
| WO | WO2006104810 A3 | 10/2006 |
| WO | WO2007044970 A2 | 4/2007 |
| WO | WO2008005017 A1 | 1/2008 |
| WO | WO2008122825 A1 | 10/2008 |

OTHER PUBLICATIONS

Redact-It Overview, http://www.redact.com/overview, downloaded Feb. 10, 2012.

U.S. Department of Energy Office of Science, The Office of Science Graduate Fellowship Program, "Resources for Handling Transcripts," downloaded Sep. 30, 2012, http://scgf.orau.gov/transcripts-resources.html.

ZyLAB, "Use Intelligent Redaction Tools to Secure Your Data", downloaded on Sep. 24, 2012.

U.S. Appl. No. 12/548,123, Oct. 8, 2012 ResponseNonfinalRejection.

U.S. Appl. No. 12/548,123, Oct. 30, 2012 SupplementalResponse.

U.S. Appl. No. 12/559,720, Dec. 27, 2012 ResponseToFinalRejection(RCE).

U.S. Appl. No. 12/648,413, Sep. 27, 2012 NonfinalRejection.

U.S. Appl. No. 12/548,123, Jul. 5, 2013 FinalRejection.

U.S. Appl. No. 12/648,413, Aug. 8, 2013 FinalRejection.

U.S. Appl. No. 12/648,413, Feb. 1, 2013 ResponseNonfinalRejection.

PCTAB2013/050355 May 3, 2013 InternationalSearchReportAndWrittenOpinion.

Bier, Eric, et al., "The Rules of redaction: identify, protect, review (and repeat)," Palo Alto Research Center, 2009 IEEE.

Damiani, Ernesto et al., "A Fine-Grained Access Control System for XML Documents," SCM Transactions on Information and System Security, vol. 5, No. 2, May 2002, pp. 169-202.

Deguillaume, Frederic, et al., Computer Science Department, CUI—University of Geneva, 24, rue du G'en'eral Dufour, CH-1211 Geneva 4, Switzerland, "Protocols for data-hiding based text document security and automatic processing," IEEE Xplore.

(56) References Cited

OTHER PUBLICATIONS

Document Technology Systems Redaction Overview, Document Technology Systems, 525 Portage Trail Extension West, Cuyahoga Falls, OH 44223, http://dts-doc.com/dtswebsite/Documents/DTS%20Redaction%20Overview.pdf.
Google Hacking, Wlkipedia, the Free Encyclopedia, (retrieved Jun. 16, 2010), http://en.wikipedia.org/wiki/Google_hacking.
IBM, "Privacy for Instant-Message or Email Popups", IP.Com, Mar. 16, 2009, https://priorart.ip.com/download/IPCOM000180738D/IPCOM000180738D.pdf.
Intellidact Intelligent Redaction Software, Computing System Innovations, 791 Piedmont Wekiwa Road, Apopka, FL 32703, http://www.csisoft.com/applications/Intellidact_flyer.pdf.
Kazem Taghva, et al., Information Science Research Institute University of Nevada, Las Vegas, "Identification and Redaction of Privacy Information in Scanned Documents," The 5th International Conference on Information Technology and Applications (ICITA 2008).
Porat, Sara et al., "Masking gateway for enterprises," IBM Haifa Research Lab, Spinger-Verlag Berlin Heidelberg 2009.
Rogers, G., "Googling Google: Google Gives Malware the Finger," ZDNet, CBS Interactive, Inc., Aug. 4, 2006, (retrieved Jun. 16, 2010), http://www.zdnet.com/blog/google/google-gives-malware-the-finger/283.
Stolfo, et al., "PARULEL: Parallel Rule Processing Using Meta-rules for Redaction," Department of Computer Science, Columbia University, New York, NY 10027, Jun. 25, 1991, pp. 1-47.
"Turn Desktop Alerts on or off," Microsoft Office Support, Outlook 2007, downloaded Apr. 26, 2012, http://office.microsoft.com/en-us/outlook-help/turn-desktop-alerts-on-or-off-HA010098670.aspx.
Wong, Alexander, et al., Department of Electrical and Computer Engineering University of Waterloo Waterloo, Ontario, Canada, "Expert Knowledge Based Automatic Regions-of-Interest (ROI) Selection in Scanned Documents for Digital Image Encryption," Proceedings of the 3rd Canadian Conference on Computer and Robot Vision (CRV'06).
U.S. Appl. No. 12/548,123, May 8, 2012 NonfinalRejection.
U.S. Appl. No. 12/559,720, Mar. 1, 2012 NonfinalRejection.
U.S. Appl. No. 12/559,720, Jun. 1, 2012 ResponseToNonfinalRejection.
U.S. Appl. No. 12/559,720, Aug. 27, 2012 FinalRejection.
Preliminary Remarks, dated Oct. 2, 2009, for U.S. Appl. No. 12/548,123, filed Aug. 26, 2009, entitled "Method for Detecting End Point of Plasma Etching and Plasma Etching Apparatus", invented by Joshua Fox et al., Total 3 pgs.
Office Action, dated May 8, 2012, for U.S. Appl. No. 12/548,123, filed Aug. 26, 2009, entitled "Method for Detecting End Point of Plasma Etching and Plasma Etching Apparatus", invented by Joshua Fox et al., Total 19 pgs.
Response to Office Action, dated Oct. 8, 2012, for U.S. Appl. No. 12/548,123, filed Aug. 26, 2009, entitled "Method for Detecting End Point of Plasma Etching and Plasma Etching Apparatus", invented by Joshua Fox et al., Total 14 pgs.
Supplemental Amendment, dated Oct. 30, 2012, for U.S. Appl. No. 12/548,123, filed Aug. 26, 2009, entitled "Method for Detecting End Point of Plasma Etching and Plasma Etching Apparatus", invented by Joshua Fox et al., Total 6 pgs.
Final Office Action, dated Jul. 5, 2013, for U.S. Appl. No. 12/548,123, filed Aug. 26, 2009, entitled "Method for Detecting End Point of Plasma Etching and Plasma Etching Apparatus", invented by Joshua Fox et al., Total 14 pgs.
Response to Final Office Action, dated Nov. 5, 2013, for U.S. Appl. No. 12/548,123, filed Aug. 26, 2009, entitled "Method for Detecting End Point of Plasma Etching and Plasma Etching Apparatus", invented by Joshua Fox et al., Total 11 pages.
0A3 for 54.117 dated Dec. 20, 2013, for U.S. Appl. No. 12/548,123, filed Aug. 26, 2009, entitled "Method for Detecting End Point of Plasma Etching and Plasma Etching Apparatus", invented by Joshua Fox et al., Total 13 pages.
Response to Office Action, dated Apr. 4, 2014, for U.S. Appl. No. 12/548,123, filed Aug. 26, 2009, entitled "Method for Detecting End Point of Plasma Etching and Plasma Etching Apparatus", invented by Joshua Fox et al., Total 4 pages.
Office Action, dated Mar. 1, 2012, for U.S. Appl. No. 12/559,720, filed Sep. 15, 2009, entitled, "Search Engine With Privacy Protection", invented by Joshua Fox et al., Total 32 pages.
Response to Office Action, dated May 9, 2012, for U.S. Appl. No. 12/559,720, filed Sep. 15, 2009, entitled, "Search Engine With Privacy Protection", invented by Joshua Fox et al., Total 8 pgs.
Supplemental Amendment, dated Jun. 1, 2012, for U.S. Appl. No. 12/559,720, filed Sep. 15, 2009, entitled, "Search Engine With Privacy Protection", invented by Joshua Fox et al., Total 19 pgs.
Final Office Action, dated Aug. 27, 2012, for U.S. Appl. No. 12/559,720, filed Sep. 15, 2009, entitled, "Search Engine With Privacy Protection", invented by Joshua Fox et al., Total 34 pages.
Response to Final Office Action, dated Dec. 27, 2012, for U.S. Appl. No. 12/559,720, filed Sep. 15, 2009, entitled, "Search Engine With Privacy Protection", invented by Joshua Fox et al., Total 21 pgs.
Notice of Allowance, dated Jun. 20, 2014, for U.S. Appl. No. 12/559,720, filed Sep. 15, 2009, entitled, "Search Engine With Privacy Protection", invented by Joshua Fox et al., Total 15 pages.
Preliminary Amendment, dated Mar. 27, 2012, for U.S. Appl. No. 12/648,413, filed Dec. 29, 2009,entitled, "Selecting Portions of Computer-Accessible Documents for Post-Selection Processing", invented by Joshua Fox et al., Total 6 pages.
Office Action, dated Sep. 27, 2012, for U.S. Appl. No. 12/648,413, filed Dec. 29, 2009,entitled, "Selecting Portions of Computer-Accessible Documents for Post-Selection Processing", invented by Joshua Fox et al., Total 19 pages.
Response to Office Action, dated Feb. 1, 2013, for U.S. Appl. No. 12/648,413, filed Dec. 29, 2009,entitled, "Selecting Portions of Computer-Accessible Documents for Post-Selection Processing", invented by Joshua Fox et al., Total 12 pages.
Final Office Action, dated Aug. 8, 2013, for U.S. Appl. No. 12/648,413, filed Dec. 29, 2009,entitled, "Selecting Portions of Computer-Accessible Documents for Post-Selection Processing", invented by Joshua Fox et al., Total 34 pages.
Response to Final Office Action, dated Nov. 8, 2013, for U.S. Appl. No. 12/648,413, filed Dec. 29, 2009,entitled, "Selecting Portions of Computer-Accessible Documents for Post-Selection Processing", invented by Joshua Fox et al., Total 15 pages.
Office Action, dated Dec. 5, 2013, for U.S. Appl. No. 12/648,413, filed Dec. 29, 2009,entitled, "Selecting Portions of Computer-Accessible Documents for Post-Selection Processing", invented by Joshua Fox et al., Total 37 pages.
Response to Office Action, dated Apr. 4, 2014, for U.S. Appl. No. 12/648,413, filed Dec. 29, 2009,entitled, "Selecting Portions of Computer-Accessible Documents for Post-Selection Processing", invented by Joshua Fox et al., Total 14 pages.
Final Office Action, dated Aug. 28, 2014, for U.S. Appl. No. 12/648,413, filed Dec. 29, 2009,entitled, "Selecting Portions of Computer-Accessible Documents for Post-Selection Processing", invented by Joshua Fox et al., Total 36 pages.
Office Action, dated Mar. 7, 2014, for U.S. Appl. No. 13/350,794, filed Jan. 15, 2012, entitled "Automated Document Redaction", invented by Joshua Fox et al., Total 36 pgs.
US Patent Application, dated Mar. 26, 2014, for U.S. Appl. No. 14/228,246, filed Mar. 27, 2014, entitled "Focused Personal Identifying Information Redaction", invented by Joshua Fox et al., Total 27 pages.
Response to Office Action, dated Jun. 9, 2014, for U.S. Appl. No. 13/350,794, filed Jan. 15, 2012, entitled "Automated Document Redaction", invented by Joshua Fox et al., Total 13 pgs.
Final Office Action, dated Jul. 16, 2014, for U.S. Appl. No. 12/548,123, filed Aug. 26, 2009, entitled "Method for Detecting End Point of Plasma Etching and Plasma Etching Apparatus", invented by Joshua Fox et al., Total 14 pgs.
Notice of Allowance, dated Jun. 19, 2015, for U.S. Appl. No. 12/559,720, filed Sep. 15, 2009, invented by Joshua Fox, Total 13 pages.

(56) References Cited

OTHER PUBLICATIONS

International Preliminary Report on Patentability, dated Mar. 20, 2012, for International Application No. PCT/EP2010/062729, filed Aug. 31, 2010, Total 12 pages.
International Search Report, dated Mar. 24, 2011, for International Application No. PCT/EP2010/062729, filed Aug. 31, 2010, Total 6 pages.
Written Opinion of the International Searching Authority, dated Mar. 15, 2012, for International Application No. PCT/EP2010/062729, filed Aug. 31, 2010, Total 11 pages.
International Preliminary Report on Patentability, dated Jul. 15, 2014, for International Application No. PCT/IB2013/050355, filed Jan. 15, 2013, Total 5 pages.
Response to Final Office Action, dated Oct. 16, 2014 for U.S. Appl. No. 12/548,123, filed Aug. 26, 2009, invented by Joshua Fox et al., Total 11 pages.
Final Office Action, dated Nov. 7, 2014, for U.S. Appl. No. 12/548,123, filed Aug. 26, 2009, invented by Joshua Fox, Total 24 pages.
Response to Final Office Action, dated Jan. 27, 2015, for U.S. Appl. No. 12/548,123, filed Aug. 26, 2009, invented by Joshua Fox, Total 10 pages.
Office Action, dated Jan. 28, 2015, for U.S. Appl. No. 13/676,712, filed Nov. 14, 2012, invented by Joshua Fox, Total 31 pages.
Restriction Requirement, dated Mar. 7, 2014, for U.S. Appl. No. 12/559,720, filed Sep. 15, 2009, invented by Joshua Fox, Total 6 pages.
Response to Restriction Requirement, dated May 8, 2014, for U.S. Appl. No. 12/559,720, filed Sep. 15, 2009, invented by Joshua Fox, Total 10 pages.
Supplemental Amendment, dated Sep. 24, 2014, for U.S. Appl. No. 12/559,720, filed Sep. 15, 2009, invented by Joshua Fox, Total 7 pages.
Notice of Allowance, dated Oct. 14, 2014, for U.S. Appl. No. 12/559,720, filed Sep. 15, 2009, entitled, "Search Engine With Privacy Protection", invented by Joshua Fox et al., Total 8 pages.
Examiner initialed Supplemental Amendment, dated Oct. 14, 2014, for U.S. Appl. No. 12/559,720, filed Sep. 15, 2009, invented by Joshua Fox, Total 1 page.
Notice of Allowance, dated Jan. 30, 2015, for U.S. Appl. No. 12/559,720, filed Sep. 15, 2009, invented by Joshua Fox, total 10 pages.
Response to Final Office Action, dated Dec. 23, 2014, for U.S. Appl. No. 12/648,413, filed Dec. 29, 2009, invented by Joshua Fox, Total 12 pages.
Final Office Action, dated Dec. 19, 2014, for U.S. Appl. No. 13/350,794, filed Jan. 15, 2012, invented by Joshua Fox et al., Total 36 pages.
Response to Final Office Action, dated Mar. 19, 2015, for U.S. Appl. No. 13/350,794, filed Jan. 15, 2012, invented by Joshua Fox et al., Total 12 pages.
Office Action, dated Mar. 26, 2015, for U.S. Appl. No. 12/548,123, filed Aug. 26, 2009, invented by Joshua Fox, Total 15 pages.
Response to Office Action, dated Apr. 27, 2015, for U.S. Appl. No. 13/676,712, filed Nov. 14, 2012, invented by Joshua Fox, Total 9 pages.
Office Action, dated Apr. 10, 2015, for U.S. Appl. No. 12/648,413, filed Dec. 29, 2009, invented by Joshua Fox, Total 45 pages.
Notice of Allowance, dated Apr. 8, 2015, for U.S. Appl. No. 13/350,794, filed Jan. 15, 2012, invented by Joshua Fox, Total 13 pages.
C. Cumby et al.,"A Machine Learning Based System for Semi-Automatically Redacting Documents", dated 2011, Proceedings of the Twenty-Third Innovative Applications of Artificial Intelligence Conference, Total 8 pages.
Final Office Action, Jun. 10, 2015, for U.S. Appl. No. 13/676,712, filed Nov. 14, 2012 by S. Avrahami et al., Total 25 pp.
Response to Final Office Action, dated Dec. 2, 2015, for U.S. Appl. No. 12/548,123, filed Aug. 26, 2009, invented by Joshua Fox, Total 7 pages.
Office Action, dated Feb. 4, 2016, for U.S. Appl. No. 12/548,123, filed Aug. 26, 2009, invented by Joshua Fox, Total 14 pages.
Office Action, dated Dec. 16, 2015, for U.S. Appl. No. 13/676,712, filed Nov. 14, 2012, invented by S. Avrahami et al., Total 21 pages.
Response to Office Action, dated Mar. 16, 2016, for U.S. Appl. No. 13/676,712, filed Nov. 14, 2012, invented by S. Avrahami et al., Total 11 pages.
Office Action, dated Nov. 20, 2015, for U.S. Appl. No. 14/842,731, filed Sep. 1, 2015, invented by Joshua Fox, Total 30 pages.
Response to Office Action, dated Feb. 22, 2016, for U.S. Appl. No. 14/842,731, filed Sep. 1, 2015, invented by Joshua Fox, Total 8 pages.
Final Office Action, dated Apr. 8, 2016, for U.S. Appl. No. 14/842,731, filed Sep. 1, 2015, invented by Joshua Fox, Total 16 pages.
Final Office Action, dated Nov. 20, 2015, for U.S. Appl. No. 12/648,413, filed Dec. 29, 2009, invented by Joshua Fox, Total 49 pages.
Response after Final Office Action, dated Jan. 20, 2016 for U.S. Appl. No. 12/648,413, filed Dec. 29, 2009, invented by Joshua Fox, Total 14 pages.
Notice of Appeal, dated Feb. 19, 2016, for U.S. Appl. No. 12/648,413, filed Dec. 29, 2009, invented by Joshua Fox, Total 2 pages.
Pre-Appeal Brief Request for Review, dated Feb. 19, 2016, for U.S. Appl. No. 12/648,413, filed Dec. 29, 2009, invented by Joshua Fox, Total 6 pages.
Notice of Allowance, dated Mar. 29, 2016, for U.S. Appl. No. 12/648,413, filed Dec. 29, 2009, invented by Joshua Fox, Total 10 pages.
US Patent Application, dated Sep. 1, 2015, for U.S. Appl. No. 14/842,731, filed Sep. 1, 2015, invented by Joshua Fox, Total 38 pages.
Response to Office Action, dated Jun. 22, 2015, for U.S. Appl. No. 12/548,123, filed Aug. 26, 2009, invented by Joshua Fox, Total 7 pages.
Final Office Action, dated Sep. 2, 2015, for U.S. Appl. No. 12/548,123, filed Aug. 26, 2009, invented by Joshua Fox, Total 14 pages.
Response to Final Office Action, dated Sep. 10, 2015, for U.S. Appl. No. 13/676,712, filed Nov. 14, 2012, invented by Joshua Fox, Total 9 pages.
Notice of Allowance, dated Jun. 19, 2015, for U.S. Appl. No. 12/559,720, filed Sep. 15, 2009, invented by Joshua Fox et al., Total 13 pages.
Response to Office Action, dated Jul. 10, 2015, for U.S. Appl. No. 12/648,413, filed Dec. 29, 2009, invented by Joshua Fox, Total 14 pages.
Notice of Allowance, dated Jul. 20, 2015, for U.S. Appl. No. 13/350,794, filed Jan. 15, 2012, invented by Joshua Fox, Total 14 pages.
Response to Final Office Action, dated Oct. 13, 2015, for U.S. Appl. No. 13/676,712, filed 11/14/2, invented by S. Avrahami et al., Total 10 pages.
Response to Office Action, dated May 4, 2016, for U.S. Appl. No. 12/548,123, filed Aug. 26, 2009, invented by Joshua Fox, Total pages.
Response to Office Action, dated May 12, 2016, for U.S. Appl. No. 12/548,123, filed Aug. 26, 2009, invented by Joshua Fox, Total 6 pages.
Final Office Action, dated Aug. 12, 2016, for U.S. Appl. No. 12/548,123, filed Aug. 26, 2009, invented by Joshua Fox, Total 16 pages.
Final Office Action, dated May 11, 2016, for U.S. Appl. No. 13/676,712, filed Nov. 14, 2012, invented by Joshua Fox, Total 21 pages.
Response to Final Office Action, dated Aug. 11, 2016, for U.S. Appl. No. 13/676,712, filed Nov. 14, 2012, invented by Joshua Fox, Total 11 pages.
Response to Final Office Action, dated Jun. 14, 2016, for U.S. Appl. No. 14/842,731, filed Sep. 1, 2015, invented by Joshua Fox, Total 9 pages.

(56) References Cited

OTHER PUBLICATIONS

Office Action, dated Aug. 25, 2016, for U.S. Appl. No. 14/842,731, filed Sep. 1, 2015, invented by Joshua Fox, Total 16 pages.
Supplemental Amendment, dated Jun. 28, 2016, for U.S. Appl. No. 12/648,413, filed Dec. 29, 2009, invented by Joshua Fox, Total 7 pages.
Response to Final Office Action, dated Nov. 11, 2016, for U.S. Appl. No. 12/548,123, filed Aug. 26, 2009, invented by Joshua Fox et. al, Total 9 pgs.
Office Action, dated Dec. 29, 2016, for U.S. Appl. No. 12/548,123, filed Aug. 26, 2009, invented by Joshua Fox et. al, Total 15 pgs.
Office Action dated Oct. 6, 2016, for U.S. Appl. No. 13/676,712, filed Nov. 14, 2012, invented by S. Avrahami et al., Total 12 pages.
Response to Office Action dated Jan. 6, 2017, for U.S. Appl. No. 13/676,712, filed Nov. 14, 2012, invented by S. Avrahami et al., Total 10 pages.
Response to Office Action, dated Dec. 27, 2016, for U.S. Appl. No. 14/842,731, filed Sep. 1, 2015, invented by Joshua Fox, Total 9 pages.
Notice of Allowance, dated Nov. 16, 2016, for U.S. Appl. No. 12/648,413, filed Dec. 29, 2009, invented by Joshua Fox, Total 27 pages.
Office Action, dated Feb. 24, 2017, for U.S. Appl. No. 14/228,246, filed Mar. 27, 2014, invented by S. Avrahami et al.,, Total 8 pages.
Response to Office Action, dated Mar. 29, 2017, for U.S. Appl. No. 12/548,123, filed Aug. 26, 2009, invented by Joshua Fox, Total 11 pages.
Final Office Action, dated Mar. 30, 2017, for U.S. Appl. No. 13/676,712, filed Nov. 14, 2012, invented by S. Avrahami et al., Total 15 pages.
Corrected Notice of Allowability, dated Feb. 21, 2017, for U.S. Appl. No. 12/648,413 filed Dec. 29, 2009, invented by Joshua Fox, Total 14 pages.
Response to Final Office Action, dated May 31, 2017, for U.S. Appl. No. 13/676,712, filed Nov. 14, 2012, invented by S. Avrahami et al., Total 10 pages.
Response to Office Action, dated May 25, 2017, for U.S. Appl. No. 14/228,246, filed Mar. 27, 2014, invented by S. Avrahami et al., Total 9 pages.
Final Office Action, dated Apr. 28, 2017, for U.S. Appl. No. 14/842,731, filed Sep. 1, 2015, invented by Joshua Fox, Total 16 pages.
Final Office Action, dated Jun. 20, 2017, for U.S. Appl. No. 12/548,123, filed Aug. 26, 2009, invented by Joshua Fox et. al, Total 17 pgs.
Notice of Allowance, dated Jun. 15, 2017, for U.S. Appl. No. 13/676,712, filed Nov. 14, 2012, invented by S. Avrahami et al., Total 21 pages.
Notice of Allowance, dated Jun. 16, 2017, for U.S. Appl. No. 14/228,246, filed Mar. 27, 2014, invented by S. Avrahami et al., Total 64 pages.
Response to Final Office Action, dated Jun. 28, 2017, for U.S. Appl. No. 14/842,731, filed Sep. 1, 2015, invented by Joshua Fox, Total 8 pages.
Notice of Allowance, dated Jul. 19, 2017, for U.S. Appl. No. 14/842,731, filed Sep. 1, 2015, invented by Joshua Fox, Total 9 pages.
Response to Final Office Action, dated Oct. 20, 2017, for U.S. Appl. No. 12/548,123, filed Aug. 26, 2009, invented by Joshua Fox et al., Total 10 pages.
Notice of Allowance, dated Sep. 25, 2017, for U.S. Appl. No. 13/676,712, filed Nov. 14, 2012, invented by S. Avrahami et al., Total 10 pages.
Notice of Allowance, dated Oct. 12, 2017., for U.S. Appl. No. 14/228,246, filed Mar. 27, 2014, invented by S. Avrahami et al., Total 10 pages.
Office Action, dated Nov. 2, 2017, for U.S. Appl. No. 12/548,123, filed Aug. 26, 2009, invented by Joshua Fox et. al, Total 18 pages.
Notice of Allowance, dated Dec. 12, 2017 for U.S. Appl. No. 14/842,731, filed Sep. 1, 2015, invented by Joshua Fox, Total 13 pages.

* cited by examiner

MEDICAL REPORT

PATIENT NAME:         SMITH, JOHN

PATIENT SSN#:    300    123-45-6789   302

DATE OF ADMISSION:    11/22/09

ATTENDING PHYSICIAN:    Bob Jones, M.D.

CHIEF COMPLAINT: Mr. Smith suffers from anemia and constipation. No diarrhea or other notable symptoms.

MEDICATIONS: Clonopril 100 mg q.d

ALLERGIES: None.

FAMILY HISTORY: Mr. Smith's father suffered from Diabetes mellitus, while his mother had artheriosclerotic heart disease.

MEDICAL REPORT

PATIENT NAME: 304 SMITH, JOHN 302

PATIENT SSN#: 123-45-6789

DATE OF ADMISSION: 306 11/22/09

ATTENDING PHYSICIAN: Bob Jones, M.D.

CHIEF COMPLAINT: Mr. Smith suffers from anemia and constipation. No diarrhea or other notable symptoms.

MEDICATIONS: Clonopril 100 mg q.d

ALLERGIES: None.
308

FAMILY HISTORY: Mr. Smith's father suffered from Diabetes mellitus, while his mother had artheriosclerotic heart disease.

MEDICAL REPORT

PATIENT NAME:  XXXXXXXXXXXX

PATIENT SSN#:  XXXXXXXXX

DATE OF ADMISSION:  11/22/09

ATTENDING PHYSICIAN:  Bob Jones, M.D.

CHIEF COMPLAINT: XXXXXXX suffers from anemia and constipation. No diarrhea or other notable symptoms.

MEDICATIONS: Clonopril 100 mg q.d

ALLERGIES: None.

FAMILY HISTORY: XXXXXXX father suffered from Diabetes mellitus, while his mother had artheriosclerotic heart disease.

SELECTING PORTIONS OF COMPUTER-ACCESSIBLE DOCUMENTS FOR POST-SELECTION PROCESSING

RELATED APPLICATIONS

The subject application is a continuation application of U.S. patent application with Ser. No. 12/648,413, filed 29 Dec. 2009, the entire content of which is herein incorporated by reference.

FIELD OF THE INVENTION

The present invention relates to editing and processing of computer-accessible documents in general, and more particularly to selecting portions of computer-accessible documents for post-selection processing.

BACKGROUND OF THE INVENTION

As technology has enabled information to be shared more widely, control of the availability of information due to legal, security, and privacy concerns has become more difficult, due in great part to the sheer volume of information that is accessible via public and private computer networks. While tools are available for protecting information using various means, they are sometimes manual-intensive and tedious to use. For example, redaction tools are available that enable human editors to manually indicate which portions of computer-accessible documents should be withheld from document requestors under various circumstances. In many instances this is done by visually scanning a document and using a mouse to control a cursor to indicate the extents of each portion of the document that is to be protected. Likewise, other types of applications require a user to repeatedly mark and select portions of a document as a primary part of the application usage Systems, methods, and/or computer program products that enable working with computer-accessible documents in a less manual-intensive manner, particularly when selecting portions of computer-accessible documents for post-selection processing such as document redaction, would therefore be advantageous.

SUMMARY OF THE INVENTION

In one aspect of the invention a method is provided for processing documents, the method including highlighting a portion of a document displayed on a computer display, where the portion is highlighted when a cursor is in a predefined location of the display relative to the location of the portion of the document, where the portion is identified as a candidate for selection for a post-selection operation prior to the cursor being in the predefined location of the display, and where the highlighting is done independent of any input received via a computer input device to indicate the extents of the portion, and recording a selection of the portion when an input that is predefined to indicate a selection action is received in association with the portion via a computer input device. System and computer program product embodiments of the invention are also provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
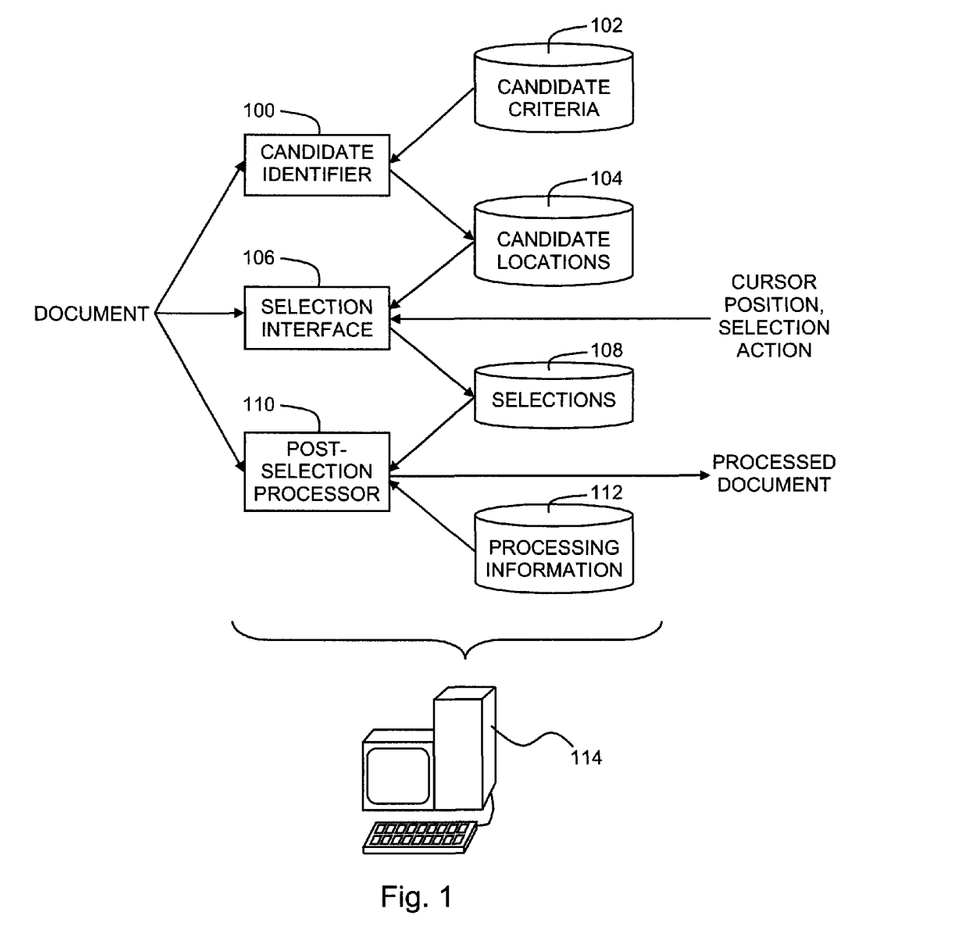
FIG. 1 is a simplified conceptual illustration of a system for selecting portions of computer-accessible documents for post-selection processing, constructed and operative in accordance with an embodiment of the invention.

Reference is now made to FIG. 1, which is a simplified conceptual illustration of a system for selecting portions of computer-accessible documents for post-selection processing, constructed and operative in accordance with an embodiment of the invention. In the system of FIG. 1, a candidate identifier 100 accesses a document, such as a Microsoft Word™-format document having one or more images, styled text, tables, columns, and/or zones, and that is preferably stored on a physically-tangible computer-readable medium, such as a magnetic data storage device.

Candidate identifier 100 preferably employs predefined candidate criteria 102 to identify one or more portions of the document as candidates for post-selection processing. Identified candidate portions of the document may include:
1. Syntactic identification of
   words, sentences, paragraphs
   images or other embedded objects
   document zones or regions
2. Semantic identification of
   named entities, such as Personal Name, Address, SSN
   semantically related portions of document, such as diagnosis and medications or any combination of the above.

Candidate identifier 100 preferably uses any conventional technique to identify such candidate portions of the document. For example, candidate identifier 100 may employ Optical Character Recognition techniques (OCR), with or without standard OCR zoning algorithms, to simultaneously understand the document as text and as a pixel-for-pixel image, which may include styled text, images, and text-in-images. Candidate identifier 100 may be configured to detect word boundaries, sentence boundaries, or paragraph boundaries by applying natural language processing (NLP) techniques.

Additionally or alternatively, candidate identifier 100 may employ linguistic grammar-based techniques as well as statistical models for named entities identification, such as by using entity-extraction features of System T™, commercially available from International Business Machines Corporation of Armonk, N.Y., to extract meaningful sequences of text according to the specifications of candidate criteria 102 which may, for example, include rules regarding redaction. For example, the system may identify Social Security Numbers, Addresses, Diagnoses, Organizations, or Personal Names. Such entity extraction may be performed on text directly extracted from the document, and/or on text derived from the document using OCR techniques.

Candidate identifier 100 preferably records the location of each identified candidate portion in a store of candidate locations 104, representing the location of each candidate portion within the document using any conventional technique, such as by line and column or X/Y offset.

A selection interface 106 preferably displays the document on a computer display, such as of a computer 114, before, during, or after candidate identifier 100 identifies the candidate portions as described above. Selection interface 106 is preferably configured to monitor the location of a cursor, such as a mouse-controlled cursor, on the computer display with respect to the displayed document, such that selection interface 106 can determine when the cursor is in a predefined location of the display relative to a given identified candidate portion of the document as stored in candidate locations 104. For example, the predefined location may be defined as when any part of the cursor is co-located with any part of a given portion. Alternatively, the predefined location may be defined as when any part of the cursor is within a predefined number of pixels of any part of a given portion. When selection interface 106 determines that the cursor is in a predefined location of the display relative to a given portion of the document as stored in candidate locations 104, selection interface 106 preferably highlights the entire portion on the display, and thereby does so independent of any input received via a computer input device that indicates the extents of the portion. Thus, for example, a user does not need to click and drag the cursor to define the extents of a portion of a document and highlight the portion. Rather, since the extents of a portion of a document are identified in advance of any cursor action with respect to the portion, the entire portion may be automatically highlighted simply by moving the cursor near to or over an identified portion. The user may then select the highlighted portion by providing an input via a computer input device and in association with the highlighted portion, such as by clicking the mouse or pressing the space bar while the cursor is on or near the highlighted portion and where such actions are predefined to indicate a selection action. Selection interface 106 preferably records in a store of selections 108 which portions of the document have been selected in this manner, such as by storing in selections 108 the location of the portion as recorded in candidate locations 104 or any other type of identifier identifying the selected portion as stored in candidate locations 104.

After a portion of the document has been selected in the manner described above, a post-selection processor 110 may perform one or more post-selection operations on the selected portion to produce a processed document, such as in accordance with predefined processing information 112 that describes how the selected portion should be processed. Examples of such post-selection operations include:

- redacting the document by withholding a selected portion from a requestor of the document who is not authorized to view or otherwise access the selected portion, where processing information 112 includes withholding rules;
- applying a visual style to the selected portion, where processing information 112 includes style information and rules, and
- submitting the selected portion as an input to a software application, where processing information 112 includes API information for the software application.

Any of the elements shown are preferably executed by or otherwise made accessible to computer 114, such as by implementing any of the elements in computer hardware and/or in computer software embodied in a computer-readable medium in accordance with conventional techniques.

Some alternative variations of the behavior of the system of FIG. 1 may include:

- If a candidate portion of a particular entity type is highlighted when the cursor is on or near the candidate portion, highlighting other candidate portions of the document that are of the same semantic entity type, such as all Social Security Numbers or all Personal Names;
- If a candidate portion of a particular value is highlighted when the cursor is on or near the candidate portion, highlighting other candidate portions of the document that are of the same value, such as all instances of "John Smith", or that are variants of the highlighted candidate portion, such as where the highlighted candidate portion is the telephone number "342-244-2944," and the variants are "1 (342) 244-2944" and "3422442944";
- If highlighting a candidate portion results in the highlighting of other related portions as described above, selection of the highlighted candidate portion will cause the automatic selection of the other highlighted related portions, optionally with a confirmation prompt;
- Multiple candidate portions that are considered close to each other in accordance with predefined closeness criteria, such as Euclidean distance, may be consolidated into a single portion and considered for selection as a single portion. For example, several candidate portions may be united within a graphical rectangle which bounds them, or several candidate portions in a syntactic unit, such as a sentence, paragraph, zone, or page, may be united by automatically highlighting the whole sentence, paragraph, zone, or page.

Figure 2:
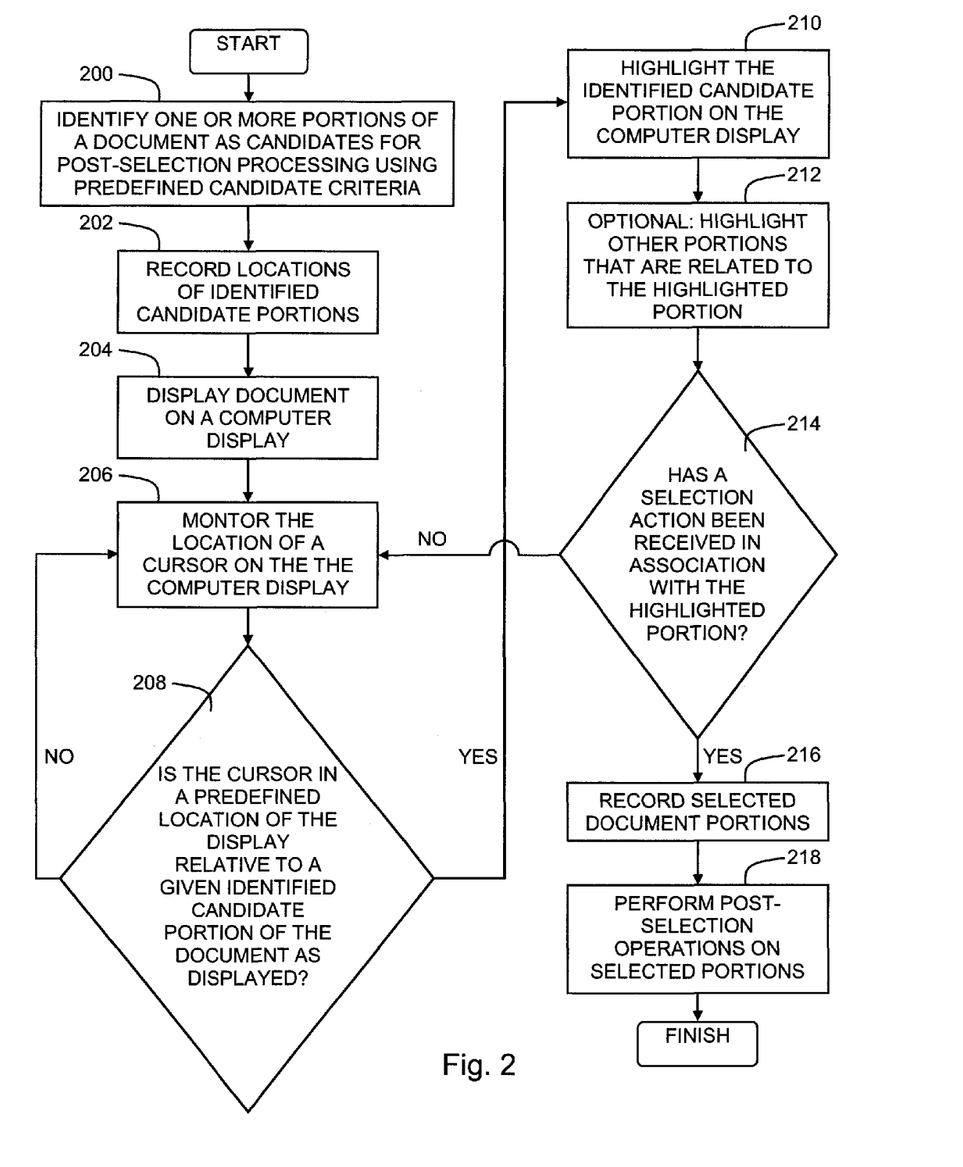
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, one or more portions of a document are identified, using predefined candidate criteria, as candidates for post-selection processing (step 200). The location of each identified candidate portion within the document is represented using any conventional technique and recorded (step 202). The document is displayed on a computer display before, during, or after the candidate portions are identified as described above (step 204). The location of a cursor on the computer display is monitored to determine when a user places the cursor in a predefined location of the display relative to a given identified candidate portion of the document as displayed (step 206). If the cursor is in such a predefined location (step 208), the identified candidate portion is highlighted on the computer display, preferably in its entirety (step 210). Optionally, other portions that are related to the highlighted portion as described above may also be highlighted (step 212). The user may select the highlighted portion or portions by performing a predefined selection action using a computer input device while the portion or portions are highlighted (step 214), and the selections are recorded (step 216). One or more post-selection operations may be performed on selected portions to produce a processed document, such as in accordance with predefined processing information that describes how the selected portion should be processed (step 218).

Figure 3A:
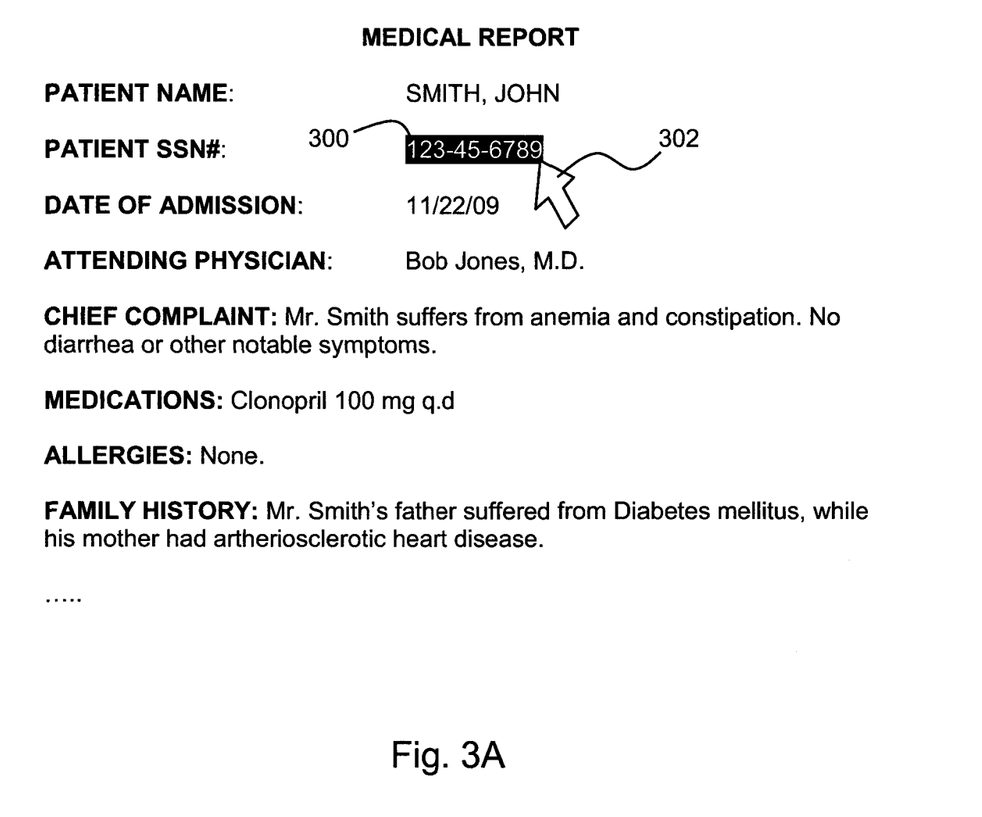
FIGS. 3A-3C are a simplified conceptual illustrations of an exemplary implementation of the system of FIG. 1 and method of FIG. 2.

An implementation of the system of FIG. 1 and method of FIG. 2 may be illustrated by way of example as shown in FIGS. 3A-3C. In FIG. 3A a document is shown of a patient's medical record. Using the system of FIG. 1 and method of FIG. 2 a patient's Social Security Number 300 is identified as a candidate for post-selection processing, being redaction in this example. When a cursor 302 is detected as touching a portion of Social Security Number 300, the entire Social Security Number 300 is highlighted without requiring any further action by the user who is controlling cursor 302. The user may then select the now-highlighted Social Security Number 300 for post-selection processing by performing a predefined selection action, such as by clicking a button on the user's mouse input device.

Figure 3B:
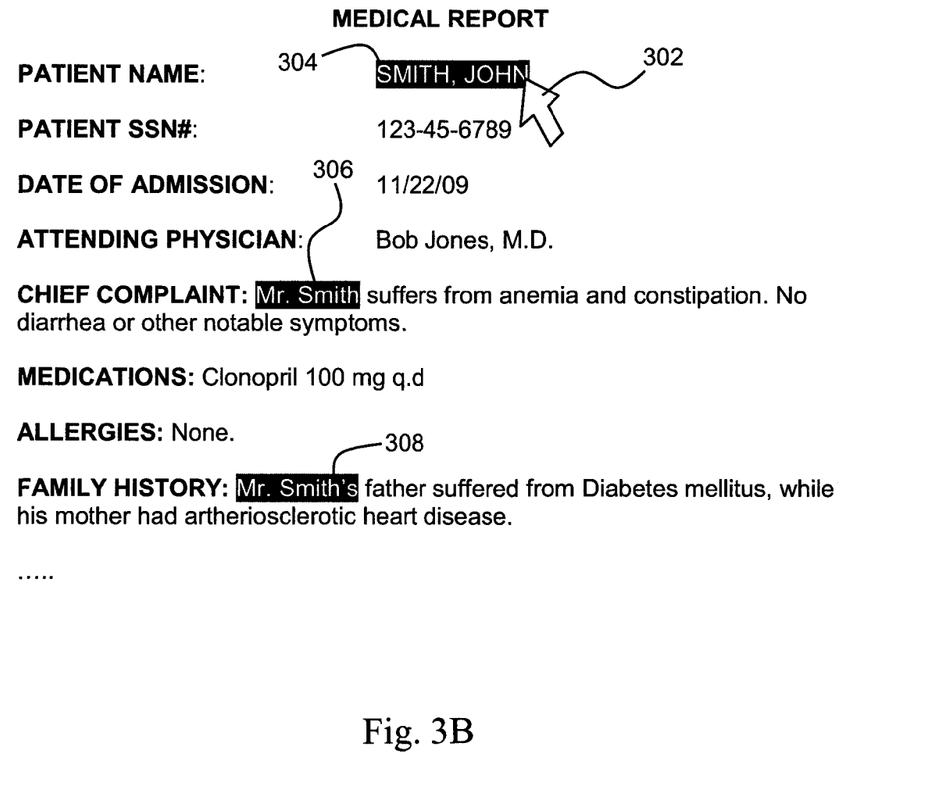

In FIG. 3B a patient's name 304 is identified as a candidate for post-selection processing. When cursor 302 is detected as touching a portion of patient name 304, the entire patient name 304 is highlighted without requiring any further action by the user who is controlling cursor 302. Additionally, variants of patient name 304 are automatically highlighted at reference numerals 306 and 308, where conventional techniques are used to identify such variants. The user may then select the highlighted patient name 304 as well as the variants 306 and 308 for post-selection processing by performing the predefined selection action.

Figure 3C:
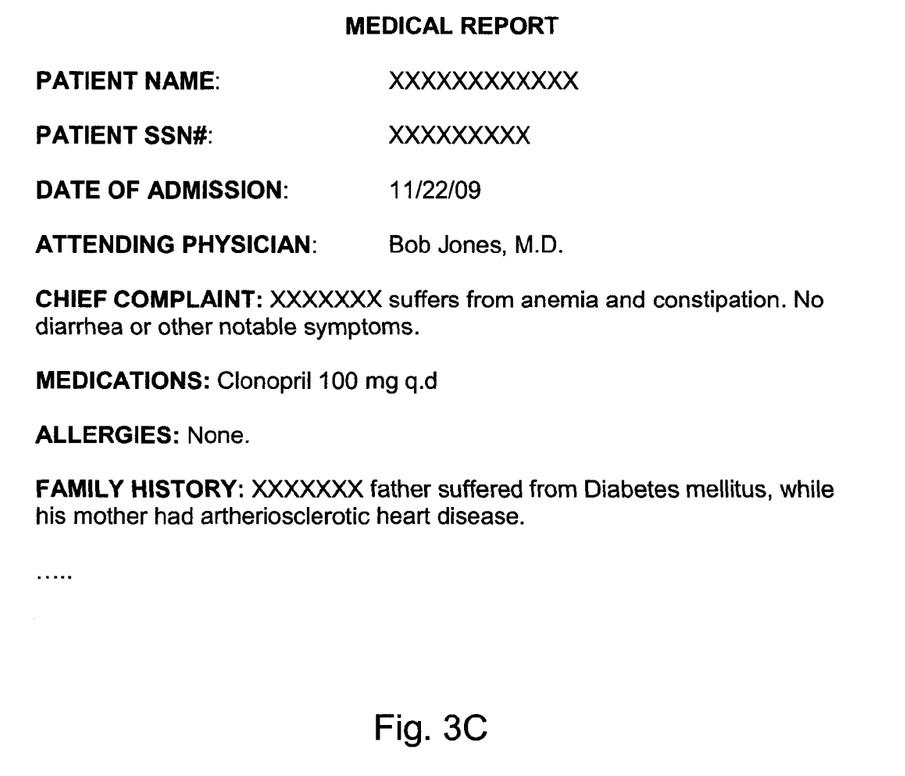

FIG. 3C shows the patient's medical record after post-selection processing, where the selected portions of the document have been redacted.

Figure 4:
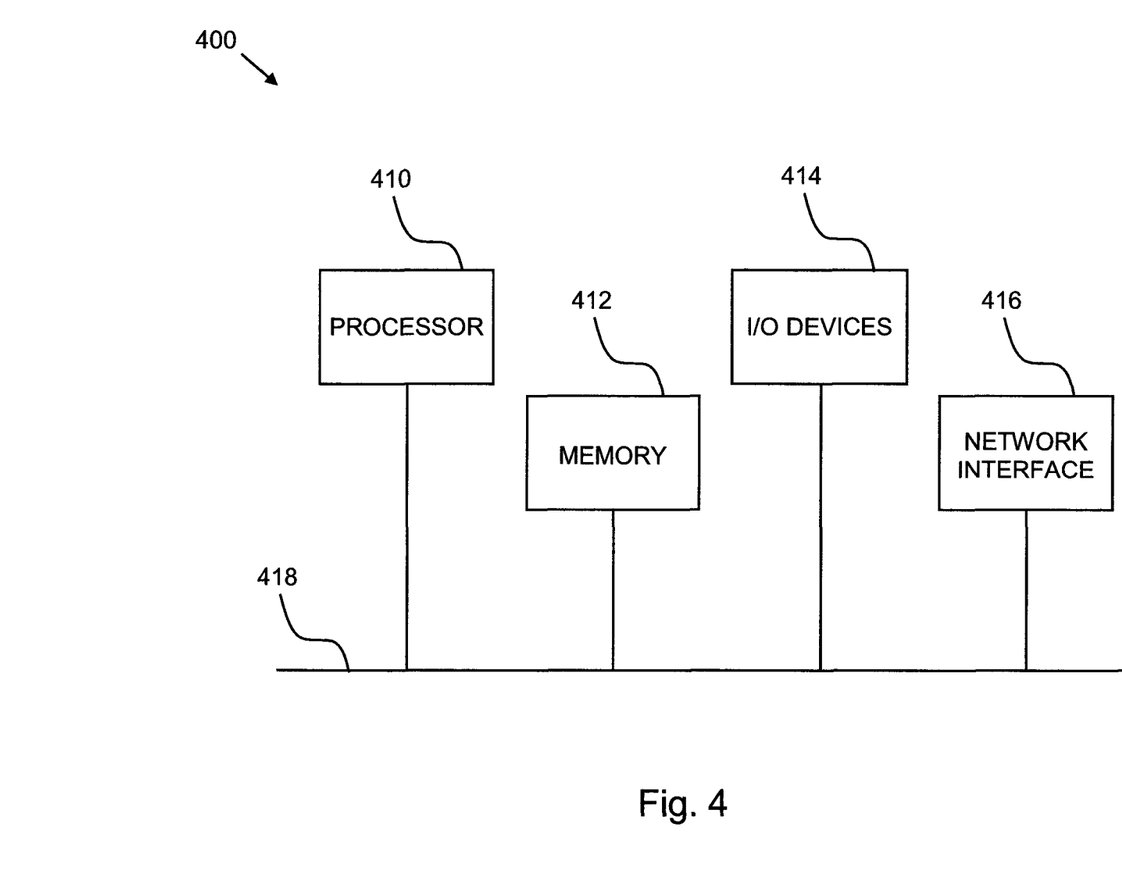
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for processing documents, the method comprising:
automatically identifying text portions of a document, along with variations of at least one of the text portions in accordance with predefined variance criteria, as candidates for potential selection for a post-selection operation when the text portions meet predefined text selection candidate criteria;
recording a location of each of the candidates within the document in a store of candidate locations;
displaying the document on a computer display;
in response to determining that a cursor is in a predefined location of the document relative to a recorded location in the store of candidate locations of a candidate from the candidates in the document in the document,
highlighting a text portion associated with the candidate in the document, wherein the highlighting is done independent of any input received via a computer input device to indicate an extent of the text portion,
in response to receiving selection of the highlighted text portion, recording the selection of the text portion in association with the text portion in a store of selections; and
performing the post-selection operation on the selected text portion of the document.

2. The method of claim 1, further comprising:
highlighting the text portion when any part of the cursor is co-located with any part of the text portion.

3. The method of claim 1, further comprising:
highlighting the text portion when any part of the cursor is within a predefined number of pixels of any part of the text portion.

4. The method of claim 1, further comprising:
concurrently highlighting the text portion and another portion of the document.

5. The method of claim 4, further comprising:
concurrently highlighting the text portion and another portion of the document, wherein the highlighted text portions are of one or more of a same semantic entity type, a same value, and variations of a same value in accordance with predefined variance criteria.

6. The method of claim 4, further comprising:
recording the selection of each of the text portions when a selection action is received in association with one of the portions.

7. The method of claim 1, further comprising:
accessing the document that is stored on a physically-tangible computer-readable medium.

8. The method of claim 7, further comprising:
consolidating into a single portion two or more of the text portions that are considered close to each other in accordance with a predefined closeness criterion.

9. The method of claim 1, wherein the text portions are identified as candidates for selection for the post-selection operation when the text portions meet the predefined text selection candidate criterion that includes one or more of word, sentence, paragraph and linguistic grammar-based criterion.

10. The method of claim 9, further comprising:
withholding the selected text portion from a requestor of the document who is not authorized to access the selected text portion.

* * * * *

UNITED STATES PATENT AND TRADEMARK OFFICE
CERTIFICATE OF CORRECTION

PATENT NO. : 9,886,159 B2
APPLICATION NO. : 13/431032
DATED : February 6, 2018
INVENTOR(S) : Fox et al.

It is certified that error appears in the above-identified patent and that said Letters Patent is hereby corrected as shown below:

On the Title Page

Column 1, (75) Inventors: should read as follows:
Joshua Fox, Emek haela (IL);
Michael Pelts, Jerusalem, (IL);
Vladislav Rybak, Ofakim, (IL)

Signed and Sealed this
Eleventh Day of October, 2022

Katherine Kelly Vidal
*Director of the United States Patent and Trademark Office*